United States Patent Office 3,542,527
Patented Nov. 24, 1970

3,542,527
ALKALI METAL PENTABORANE-8 AND PROCESS FOR PRODUCTION THEREOF
Sheldon G. Shore and Russell A. Geanangel, Columbus, Ohio, assignors to The Ohio State University Research Foundation, Columbus, Ohio, a corporation of Ohio
No Drawing. Filed Dec. 13, 1967, Ser. No. 690,064
Int. Cl. C01b 6/22
U.S. Cl. 23—364                12 Claims

ABSTRACT OF THE DISCLOSURE

Stable ether solutions of alkali metal pentaborane-8 ($M^+B_5H_8^-$, wherein M=alkali metal) and process for production of same by low-temperature reaction of pentaborane-9 with alkali metal hydride, alkyl lithium, sodium methylacetylide or lithium methylacetylide. Products are useful in preparing $B_5H_8$-derivatives and other boron derivatives such as hexaborane-10 and decaborane-14.

---

The invention described herein was made in the course of or under a grant from the National Science Foundation, an agency of the United States Government.

BRIEF DESCRIPTION OF THE INVENTION

The present invention relates to new compounds, and is more particularly concerned with novel stable ether solutions of alkali metal pentaborane-8 and production of the same by a novel process involving low-temperature reaction of pentaborane-9 with an alkali metal hydride, alkyl lithium, sodium methylacetylide or lithium methylacetylide.

The products of the invention are useful in the preparation of numerous pentaborane ($B_5H_8^-$) derivatives and other boron hydrides such as hexaborane-10 and decaborane-14. The latter compounds are prepared by reacting the product of the invention with diborane.

In accord with the procedure of our copending application Ser. No. 690,063, filed Dec. 13, 1967, this generally involves reaction of equimolar quantities in anhydrous ether solution at about room temperature or reflux for several hours, removal of volatile materials in vacuo, and sublimation of the decaborane-14 from the reaction mixture at elevated temperatures. Decaborane-14 is known to be useful in making carborane polymers, especially elastomers, having unusual thermal stabilities.

The present invention, therefore, provides new and useful products, by a process which is unobvious and the result of which is unpredictable, in view of the fact that the hydrogen of pentaborane-9 is normally thought of as being non-reactive toward $CH_3^-$ or $H^-$. For example, Reference 1 below shows no reaction of NaH and $B_5H_9$ in diethyl ether.

It is accordingly an object of the present invention to provide new products and a new process for the production thereof, as more fully specified in the abstract hereof. A further object is the provision of such a process which starts with the readily available starting material pentaborane-9. Additional objects of the invention will become apparent hereinafter, and still others will be apparent to one skilled in the art to which this invention pertains.

BACKGROUND OF THE INVENTION

The first published report of $B_5H_8^-$ or its derivatives claimed production of the product

$(CH_3)_3NH^+RB_5H_7^-$ (R=$C_2H_5$)

(1) Hough et al., J. Am. Chem. Soc. 85, 831 (1963). Subsequent investigators could not duplicate this earlier work. (2) Onak et al., Inorganic Chemistry 6, 1465 (1967). In the latter paper, $NaB_5H_8$ is reported to result from treatment of pentaborane-9 with sodium hydride-mineral oil in diglyme at room temperature. However, we have found that, even when prepared at low temperatures, $NaB_5H_8$ decomposes rapidly at ambient temperatures as evidenced by changes in color, solubility, and boron-11 NMR spectra. It is therefore clear that, if it was prepared at all, the reported (2) $NaB_5H_8$ had only a transitory existence. The evidence indicates that it probably never was formed, since its alleged preparation was carried out for extended periods at room temperature and the boron-11 (12.8 mc.) NMR spectrum reported consisted of ". . . three broad partly overlapping peaks at $\delta(BF_3 \cdot (C_2H_5)_2O=0.0)+4$, $+16.5$ and $+27.5$," whereas the actual spectrum (19.3 mc.) of $NaB_5H_8$ as found by us consists in the cold, e.g., at $-60°$ C., of two sharp doublets at $+16.9$ and $+52.7$ p.p.m., the doublet at $+52.7$ representing the apical boron in the initial pyramidal environment of $B_5H_8^-$. $LiB_5H_8$, $NaB_5H_8$, and $KB_5H_8$ ether solutions, as prepared by us, have been shown by boron-11 NMR spectra to be stable indefinitely at temperatures of $-20°$ C. or below, but to decompose or isomerize rapidly at room temperatures.

The preparation of $LiB_5H_8$ has also been reported by (3) Gaines et al., J. Am. Chem. Soc. 89, 3375 (June 21, 1967), received date Apr. 21, 1967. The present application is based upon our belief that we are, despite these earlier publications, first inventors of the subject matter claimed in this patent application.

We have found that the sodium and potassium salts of $B_5H_8^-$ decompose rapidly on approaching room temperature; a light yellow precipitate appears and the high-field doublet in the boron-11 NMR spectrum disappears. On the other hand, samples of $LiB_5H_8$ in solution show no apparent decomposition for periods of up to one hour at room temperature.

Boron-11 NMR spectra of $LiB_5H_8$, $NaB_5H_8$, and $KB_5H_8$, generated and kept at low temperatures to prevent decomposition, are simpler than those previously reported (2, 3). They consist of an up-field doublet, assigned to an apical boron, and a low-field doublet, assigned to basal borons. The chemical shift and coupling constant of the high-field doublet are essentially constant over the temperature range $-80°$ to $35°$. However, the low-field doublet in the $LiB_5H_8$ spectrum is temperature dependent. The chemical shift goes to higher field and the coupling constant decreases with increasing temperature. From $-80°$ to $-60°$ C., the low-field doublet is symmetrical in appearance; from $-50°$ to $0°$ C., it is asymmetric in appearance, resolving to a symmetrical doublet at room temperature. In one of the spectra of undecomposed $B_5H_8^-$ salts, over the entire temperature range studied, was a peak at 11.8 p.p.m. observed. Such a peak, previously reported (3), might arise from unreacted pentaborane-9 or from decomposition of the specimen.

GENERAL PROCEDURE

The desired alkali metal pentaborane-8 product, having the formula $M^+B_5H_8^-$, wherein M is an alkali metal, can be produced by reaction of pentaborane-9 with an alkali metal hydride, a lithium alkyl, sodium methylacetylide or lithium methylacetylide, in a suitable substantially anhydrous ether solvent, with $CH_3Li$, KH, and especially NaH, being preferred.

Solvents for the reaction include the simple ethers, the cyclic ethers, and the higher ethers, with ethers having increased solvent polarity being preferred as they enhance the ease and rate of generation of the $B_5H_8^-$ solution. Diethyl ether, dilower- and dihigher-alkyl ethers, tetrahydropyran, glyme, diglyme, and similar ethers are suitable. Especially preferred are glyme, diglyme, and generally the Ansul (TM) series of alkoxyalkyl ethers, such as Ansul 121 (CH$_3$OCH$_2$CH$_2$OCH$_3$)

141 [CH$_3$(OCH$_2$CH$_2$)$_2$OCH$_3$]

161 [CH$_3$(OCH$_2$CH$_2$)$_3$OCH$_3$] and

181 [CH$_3$(OCH$_2$CH$_2$)$_4$OCH$_3$]

The product is not removed from the ether solution in which formed, but is used as such.

Optimum yields result from preparations in which the reactants are present in equimolar quantities. Greater quantities of the metal hydride, metal alkyl, or metal acetylide, at least up to about a 2:1 ratio serve to hasten B$_5$H$_8$$^-$ generation and production of the desired product.

The reaction time is not unusually significant. Sufficient time is merely allowed for evolution of the hydrogen or alkane, e.g., methane, formed in the process. Reaction ratios and temperature variation within the specified range may influence speed of reaction somewhat.

Reaction temperature is most important. Since the product, even in ether solution, is unstable at temperatures above about —20° C., preparation of the alkali metal pentaborane-8 product is carried out at about —20° C. or below, preferably about —20° C. to —80° C. The temperature of the reaction product should not be permitted to rise significantly above —20° C. unless the product is to be used immediately, and even here some risk of decomposition or isomerization is involved since even the most stable of the products, LiB$_5$H$_8$, shows noticeable decomposition after standing at room temperature for more than one hour.

SPECIFIC EMBODIMENTS OF THE INVENTION

The following preparations are given by way of illustration only, and are not to be construed as limiting.

Preparation 1.—LiB$_5$H$_8$ (lithium pentaborane-8)

A typical preparation of LiB$_5$H$_8$ was carried out by first syringing 6.0 ml. of 1.67 molar CH$_3$Li-diethyl ether solution (10.0 mmoles) into a reaction tube in a dry nitrogen atmosphere. The tube was then evacuated while frozen and 10.0 mmoles of pentaborane-9 condensed in. The tube was warmed briefly to about —50° C. to allow the B$_5$H$_9$ to melt and mix with the methyl lithium solution, and the reaction was then thermostated at —78° C. and stirred for several hours until evolution of CH$_4$ gas ceased. The reaction took place according to the equation shown below with evolution of 9.8 mmoles of CH$_4$.

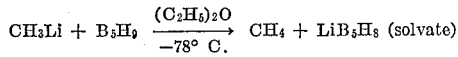

$$\text{CH}_3\text{Li} + \text{B}_5\text{H}_9 \xrightarrow[-78° \text{ C.}]{(\text{C}_2\text{H}_5)_2\text{O}} \text{CH}_4 + \text{LiB}_5\text{H}_8 \text{ (solvate)}$$

The LiB$_5$H$_8$ solution has been shown by boron-11 NMR to be stable indefinitely at temperatures up to about —20°.

Preparation 2.—NaB$_5$H$_8$ (sodium pentaborane-8)

A typical preparation of NaB$_5$H$_8$ was carried out by placing a known quantity (10.8 mmoles) of sodium hydride, NaH, in a reaction vessel along with about 30 ml. of dry glyme (1,2-dimethoxyethane). The vessel was frozen evacuated, and 9.8 mmoles of B$_5$H$_9$ was added by condensation. The vessel was briefly warmed to —50° C. and then thermostated and stirred at —78° C. until no further H$_2$ evolution was detected. The reaction occurred according to the following equation, resulting in the evolution of 9.8 mmoles of H$_2$.

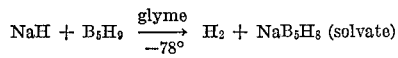

$$\text{NaH} + \text{B}_5\text{H}_9 \xrightarrow[-78°]{\text{glyme}} \text{H}_2 + \text{NaB}_5\text{H}_8 \text{ (solvate)}$$

Our studies of the boron-11 NMR spectra of the NaB-H$_8$-glyme solutions indicate that the B$_5$H$_8$$^-$ ion is essentially completely decomposed or isomerized after only a few minutes at room temperature.

Preparation 3.—KB$_5$H$_8$ (potassium pentaborane-8)

Solution of KB$_5$H$_8$ in glyme or diglyme [bis(2-methoxyethyl)-ether] have been generated in a manner exactly analogous to that described in Preparation 2 for NaB$_5$H$_8$ except that potassium hydride is substituted for sodium hydride. Boron-11 NMR spectra also indicate rapid decomposition or isomerization of KB$_5$H$_8$ upon reaching room temperature.

Preparation 4.—Variations

When following the procedure of Preparation 1 but employing sodium methylacetylide or lithium methylacetylide, instead of the methyl lithium, the same product is produced.

Various substitutions and equivalents will immediately be apparent to one skilled in the art, and it is therefore to be understood that the invention is not restricted to the exact compounds, compositions, procedure, or reaction conditions disclosed, but is only to be limited by the full scope of the appended claims, including application thereto of the doctrine of equivalents.

We claim:
1. A stable substantially anhydrous ether solution of an alkali metal pentaborane-8 represented by the formula M$^+$B$_5$H$_8$$^-$ wherein M is an alkali metal.

2. The product of claim 1 wherein the alkali metal pentaborane-8 is lithium pentaborane-8 (LiB$_5$H$_8$).

3. The product of claim 1 wherein the alkali metal pentaborane-8 is sodium pentaborane-8 (NaB$_5$H$_8$).

4. The product of claim 1 wherein the alkali metal pentaborane-8 is potassium pentaborane-8 (KB$_5$H$_8$).

5. The product of claim 1 wherein the ether is selected from the group consisting of diethyl ether, glyme, and diglyme.

6. The product of claim 1 maintained at a temperature not significantly in excess of —20° C.

7. A process for the preparation of a stable substantially anhydrous ether solution of an alkali metal pentaborane-8 which comprises the step of reacting together pentaborane-9 and a member of the group consisting of an alkali metal hydride, an alkyl lithium, sodium methylacetylide, and lithium methylacetylide in a substantially anhydrous ether solvent at a temperature not greater than about —20° C.

8. The process of claim 7 wherein the temperature is about —80° C. to about —20° C.

9. The process of claim 7 wherein the reactants are pentaborane-9 and methyl lithium.

10. The process of claim 7 wherein the reactants are pentaborane-9 and sodium hydride.

11. The process of claim 7 wherein the reactants are pentaborane-9 and potassium hydride.

12. The process of claim 7 conducted in an ether having a relatively high polarity.

References Cited

Gaines et al., "Journal of the American Chemical Society"; June 21, 1967, p. 3375.

"Chemical Abstracts," vol. 30, September 1936, p. 4421.

Hughes et al., Production of the Boranes and Related Research, Academic Press, N.Y., 1967, p. 262.

A.C.S. Publication No. 32, Borax to Boranes, Washington, D.C., 1961, pp. 190–91.

Onak et al., "Inorganic Chemistry," vol. 6, No. 8, August 1967, pp. 1465–71.

OSCAR R. VERTIZ, Primary Examiner

G. O. PETERS, Assistant Examiner

U.S. Cl. X.R.

23—360

OSURF 11

UNITED STATES PATENT OFFICE
CERTIFICATE OF CORRECTION

Patent No. 3,542,527            Dated November 24, 1970

Inventor(s) Sheldon G. Shore and Russell A. Geanangel

It is certified that error appears in the above-identified patent and that said Letters Patent are hereby corrected as shown below:

Column 2, Line 51          "one"       should read --- none ---
Appl. Page 4, Line 6

Column 3, Line 5          "[$CH_3(OCH_2CH_2)_3OCH_3$]"
Appl. Page 4, Line 26          should read
                             --- [$CH_3(OCH_2CH_2)_3OCH_3$] ---

Column 3, Line 61          "frozen evacuated"
Appl. Page 6, Line 16          should read
                             --- frozen, evacuated ---

Column 3, Line 70          "$NaB-H_8-$" should read --- $NaB_5H_8-$
Appl. Page 6, Line 24

Column 4, Line 2          "Solution" should read --- Solutio
Appl. Page 7, Line 2

Signed and sealed this 29th day of June 1971.

(SEAL)
Attest:

EDWARD M. FLETCHER, JR.          WILLIAM E. SCHUYLER,
Attesting Officer               Commissioner of Paten